United States Patent [19]
Asakawa et al.

[11] Patent Number: 5,121,260
[45] Date of Patent: Jun. 9, 1992

[54] READ CHANNEL OPTIMIZATION SYSTEM

[75] Inventors: Gary J. Asakawa; Robert Y. Noguchi; Joe Rinaldis, all of Colorado Springs, Colo.

[73] Assignee: Digital Equipment Corporation, Maynard, Mass.

[21] Appl. No.: 369,741

[22] Filed: Jun. 22, 1989

[51] Int. Cl.⁵ .................. G11B 27/36; G11B 5/02; G11B 5/09
[52] U.S. Cl. ........................ 36/31; 360/25; 360/53
[58] Field of Search .............. 360/31, 25, 53, 46

[56] References Cited

U.S. PATENT DOCUMENTS

| | | | |
|---|---|---|---|
| 4,003,084 | 1/1977 | Fletcher et al. | 360/25 |
| 4,480,274 | 10/1984 | Coleman, Jr. | 360/31 |
| 4,746,991 | 5/1988 | Efron et al. | 363/58 X |
| 4,799,112 | 1/1989 | Bremmer et al. | 360/51 |
| 4,908,722 | 3/1990 | Sonobe | 360/46 |

FOREIGN PATENT DOCUMENTS 0227389  7/1987  European Pat. Off. ......... 360/31

*Primary Examiner*—Aristotelis Psitos
*Assistant Examiner*—Varsha V. Sheladia
*Attorney, Agent, or Firm*—Arnold, White & Durkee

[57] ABSTRACT

A method of correcting read channel signal compensation in magnetic storage data storage systems with calibration data stored on select portions of the magnetic recording medium.

22 Claims, 1 Drawing Sheet

READ CHANNEL OPTIMIZATION SYSTEM

FIELD OF THE INVENTION

The present invention relates to signal compensation for magnetic data storage systems, and more particularly to methods for automatically adjusting read channel compensation for recording media in magnetic data storage systems.

BACKGROUND OF THE INVENTION

When data is to be stored and retrieved from magnetic recording media, the parameters of the write channel and the read channel are generally optimized for the best combination of high storage density and low data error rate. During the write process, the write current, the write signal amplitude equalization and the write signal phase equalization are all adjusted to provide the best possible performance with the combination of the read/write transducer and recording medium used. With magnetic recording discs, these parameters are also advantageously adjusted for different track radii.

The parameters of the read channel are generally fixed at compromise settings during the read process, and these settings are not responsive to changes in the recording media, or in the case of magnetic discs, to track radii. Since there is no reference data signal to which the read signal can be directly compared, there are no convenient ways of analyzing the read signal to provide meaningful information which can be used for adjusting read channel compensation. In contrast, as indicated above, during the write process the written signal can be retrieved from the recording medium as it is written to compare it to the data signal so that the write channel compensation can be optimized. Although adaptive read channel techniques have been developed to allow for the optimization of the read channel compensation, these methods involve extensive digital signal processing requiring large amounts of computing power, which make them impractical for most data storage systems.

SUMMARY OF THE INVENTION

According to the method of the present invention, test signals are written with a signal transducer (head) on an associated data storage medium of a data storage system to form written test signals. The written test signals are subsequently read with the signal transducer, and selected parameters of the read test signals are analyzed to form parameter measurement data which is then stored. The analysis is performed for different areas or zones of the storage medium and the parameter measurement data from each zone is identified and stored. This stored parameter measurement data is written on at least one selected portion of the storage medium to form calibration data. It is within the scope of the present invention to write the stored parameter measurement data more than once at different locations on the storage medium.

The read channel compensation parameters are set at a typically average or median value. The calibration data is read and then correlated with a range of read channel compensation correction values to form a set of selected read channel compensation correction values. Finally, these selected read channel compensation correction values are used to modify the selected values of the read channel compensation parameters. By following the above-described method the read channel compensation parameters are optimized during the read process in accord with the specific characteristics of the portion of the recording medium being read with its associated signal transducer. The selected parameters of the read test signals which are analyzed to form the parameter measurement data include at least one of the following parameters: write current, pulse width, pulse amplitude and pulse asymmetry.

DESCRIPTION OF THE PREFERRED EMBODIMENT

Figure 1:
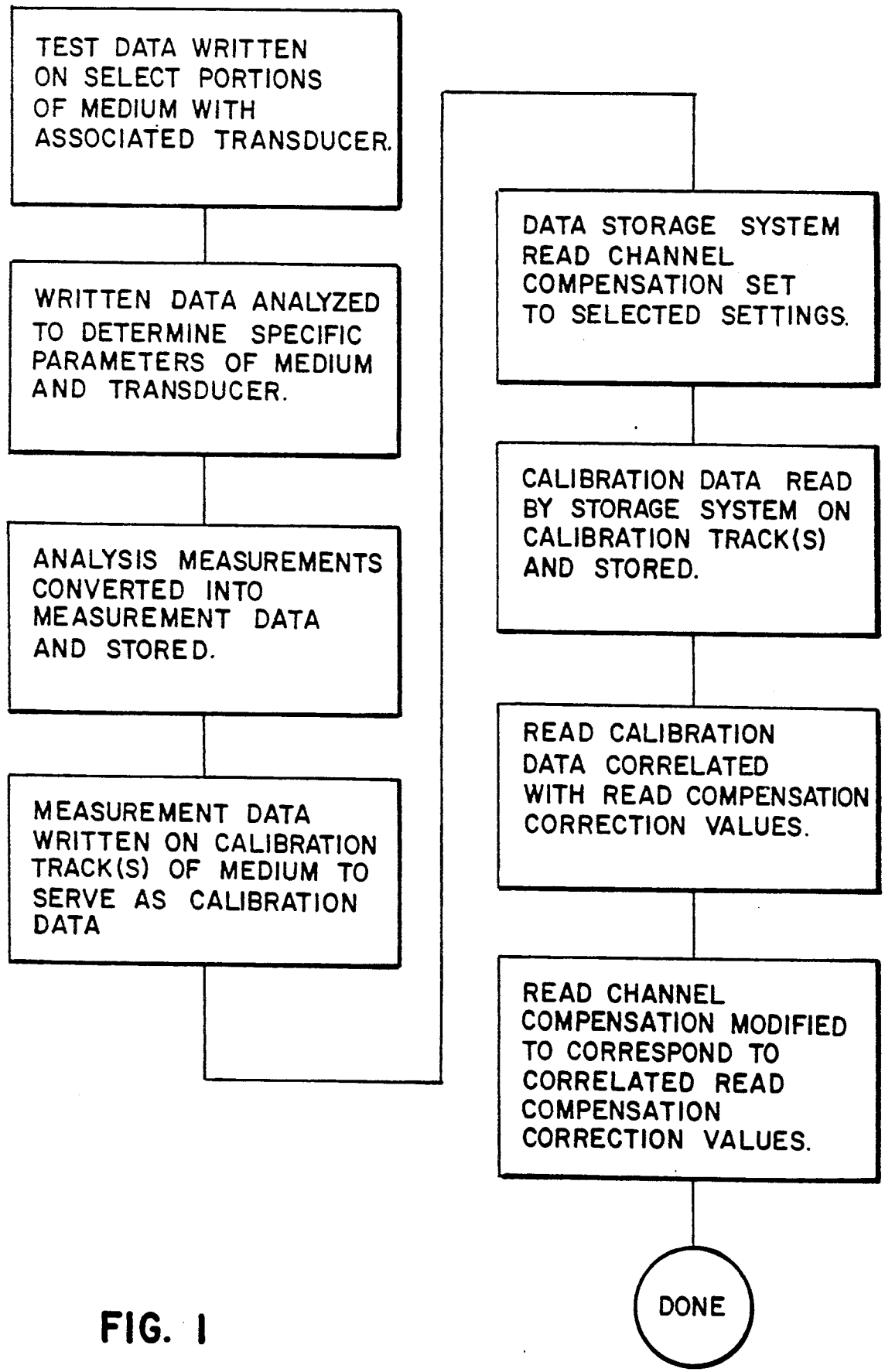
FIG. 1 is a flow chart of the methodology according to the present invention.

The present invention enables a magnetic data storage system to adapt its read channel compensation according to the individual characteristics of the specific recording medium and transducer that it uses. This technique can be used with any magnetic data storage media, such as tape, drum, card or disc. Because of the high information storage density which is generally desirable with discs coupled with the variable track velocity characteristics of most disc systems which employ constant angular velocity drives, the description of the preferred embodiment is directed primarily to its implementation with disc systems, although it may easily be used with the other magnetic storage media formats.

FIG. 1 is a general flow chart of the methodology according to the present invention. A recording medium, such as a hard-type magnetic recording disc and its associated read/write head, is tested after installation in its associated carrier, but before being installed into a complementary data storage system drive. The testing procedure comprises writing a series of magnetic transitions, which are recorded in the form of simple patterns or data representing ordinary data input converted to a high efficiency digital code, such as the ⅔ code.

The written data regardless of format is read as it is being written and at least one parameter of this read data is then analyzed to determine specific characteristics of the disc and its associated read/write head under test. For instance, the write current necessary to attain a desired value of overwrite is obtained from saturation curves generated from the written signal. The magnetic transition pulses generated from the written signal when read is measured in width, for instance as PW 50 and PW 25 data. These measurements represent the widths of the pulses at the 50 and 25 percent peak amplitude points, respectively. The magnetic transition pulses are measured to determine their amplitude and phase shift distortion caused by the disc characteristics.

In the preferred embodiment, the write current, magnetic transition pulse width, amplitude and phase shift distortion are measured at more than one disc radius. This is desirable because the write characteristics of the disc invariably change with the linear velocity of the track being written. Since such discs are usually used in constant angular velocity drives, the write characteristics of the smaller radii inner tracks will be different than the corresponding characteristics of larger radii outer tracks. Therefore, it is desirable to perform this analysis on at least one outer track and one inner track of the disc. Critical applications will benefit from analysis at intermediate track locations as well. For instance, four different radii tracks, representing four different "zones" of the disc, may be tested to provide more comprehensive data. It is within the scope of the present invention to measure a greater or lesser number of tracks representing a corresponding number of different radii zones.

The analysis made of the parameters of the read test signals from each tested track using well known measurement methods are converted into ordinary measurement data. This parameter measurement data is stored as each measurement is made. When all the measurements at all the desired track locations are complete, the stored parameter measurement data is sequentially written in sets for each of the tested tracks on at least one selected sector of at least one dedicated calibration track on the disc. This measurement data then serves as calibration data for the read process. The calibration data so written is not a recreation of the measured parameters, but rather the values of the measurements written in ordinary data words. The calibration data is preferably repeated in more than one calibration track sector, and repeated in each sector of each track a number of times, as space allows. The calibration data for different zones is differentiated with identifiers for identifying locations of each set of measurement data. The repetitive data sets provide redundancy to reduce the possibility of written data error. After the disc/head combination is so analyzed and written with the calibration data, the disc may be installed in a disc drive for a magnetic data storage system.

After the disc is installed in the disc drive, the disc drive is programmed to read the calibration data each time the drive spins up using ordinary well known programming procedure. As part of this operation, the read/write heads are positioned over the calibration track, or any one of the calibration tracks, if multiple calibration tracks have been written. The calibration data written on the calibration track is then read and stored in an internal memory of the disc drive processor. At the same time, the drive is programmed to set its read channel equalizer to nominal settings which represent compromise values of read channel compensation using well known programming procedure.

When the disc drive read/write head is positioned to read data from a selected track on the disc, the stored calibration data for the tested track in the zone of the selected track is accessed. The accessed calibration data is then correlated with the set read compensation values and the compromise settings made for the read channel equalizer are optimized. This optimization is accomplished by first processing the calibration data for the selected track of the disc to be read using well known processing procedure. If there is only one set of calibration data for the entire disc, then this set of calibration data is processed. However, if there is a different set of calibration data for different "zones" of the disc, then the set of calibration data which corresponds to the zone in which the selected track is situated is selected. The selection of the proper calibration data set is easily achieved by correlating the selected track with one of the zone identifiers written with each different set of calibration data, as explained above. The set of calibration data with the same identifier as that correlated with the selected track is then selected.

The selected calibration data then determines the proper correction to the read channel compensation from the initial compromise settings. This is accomplished by translating each set of the measurement values in the calibration data to a corresponding set of read channel compensation correction values. This translation is done with a suitably programmed translation PROM (programmable read-only memory) in the disc drive processor which correlates each set of the measurement values in the calibration data with the corresponding set of read channel compensation correction values using ordinary well known programming procedure.

The read channel compensation correction values are then used to change the characteristics of the read channel equalizer from the initial compromise values. Of course, the procedure for correcting the equalizer compensation settings will depend upon the type of equalizer used in the disc drive. If it is of a programmable delay line type, the correction values directly reprogram the equalizer to achieve the desired read channel characteristics. If the equalizer is of a "Slim/Tilt" type, the first derivative of the read channel signal waveform is used to correct for phase-shift induced pulse asymmetry (Tilt) and the second derivative is used to correct for amplitude-shift induced phase overlap (Slim). For this type of equalizer, the correction values are, or are converted into, analog signals which control the amount of the Tilt and Slim signals with the read channel signal by controlling the gain of variable gain amplifiers which alter the amplitudes of the Slim and Tilt signals.

The corrected equalizer compensation so made will suffice for the remainder of the read cycle, so long as the selected track remains in the "zone" for which the equalizer has been corrected. The equalization correction process is renewed whenever the disc drive spins up, so that any loss of memory in a power shutdown and any change of discs with associated read/write heads in the disc drive is compensated for in the read channel compensation correction process described above.

The parameters which are measured and written on the disc as calibration data are used to develop correction values for correcting the read channel equalizer in a variety of well known ways. For "Slim/Tilt" disc drive equalizers, the PW 50 and PW 25 data is useful in determining the degree of high frequency amplitude shift distortion, since higher values of PW 50 and PW 25 indicate more such amplitude distortion, and therefore indicate how much "Slim" signal should be mixed with the read signal. The write current and amplitude data is useful in determining the suitable overall gain for the equalizer. The asymmetry data is useful for determining how much "Tilt" signal should be added to the read channel signal.

Thus there has been described herein a method for correcting read channel compensation in magnetic data storage systems with calibration data stored on select portions of the magnetic recording medium. It will be understood that various changes in the details, arrangements and configurations of the components and systems which have been described above in order to explain the nature of the present invention may be made by those skilled in the art within the principle and scope of the invention as expressed in the appended claims.

What is claimed is:

1. A method of adjusting the read channel compensation parameters values of a data storage system having a storage medium to provide the optimum compensation for said storage system, comprising the steps of:

writing test signals on a portion of said storage medium with a first signal transducer to form written test signals;

reading said written test signals from said storage medium with said first signal transducer to form read test signals;

analyzing at least one selected parameter of said read test signals to form corresponding parameter measurement data;

storing said parameter measurement data;

writing said stored parameter measurement data on at least one selected portion of said storage medium with said first signal transducer to form calibration data;

setting read channel compensation parameters for said storage system to selected values;

reading said written calibration data from said selected portion of said storage medium with a second signal transducer to form read calibration data;

correlating said read calibration data with corresponding read channel compensation parameter values to form selected read channel compensation correction values; and adjusting said selected values of said read channel compensation parameters with said selected read channel compensation correction values to optimize said read channel compensation parameter values.

2. The method recited in claim 1, wherein said step of writing said parameter measurement data comprises writing said measurement data on at least one selected track of said storage medium to form at least one calibration track with said calibration data.

3. The method recited in claim 2, wherein said step of writing said parameter measurement data further comprises writing said measurement data on one selected sector of said calibration track.

4. The method recited in claim 3, wherein said step of writing said parameter measurement data further comprises writing said measurement data more than once on said selected sector of said calibration track.

5. The method recited in claim 2, wherein said step of writing said parameter measurement data further comprises writing said measurement data on at least two selected sectors of said calibration track.

6. The method recited in claim 5, wherein said step of writing said parameter measurement data further comprises writing said measurement data more than once on each of said selected sectors of said calibration track.

7. The method recited in claim 1, wherein said step of writing said test signals comprises writing said test signals on a selected number of tracks on said storage medium having different positions to form test tracks with said test signals, each of said test tracks representing a different storage medium zone.

8. The method recited in claim 7, wherein said step of analyzing said selected parameters of said read test signal further comprises analyzing said parameters from each of said test tracks to form a set of parameter measurement data for each of said storage medium zones.

9. The method recited in claim 8, wherein said step of writing said stored parameter measurement data further comprises writing said sets of measurement data for each of said storage medium zones sequentially on at least one track of said storage medium to form at least one calibration track with sets of said calibration data for each of said storage medium zones.

10. The method recited in claim 9, wherein said step of writing said parameter measurement data further comprises writing said sets of parameter measurement data for each of said storage medium zones on a selected sector of said calibration track.

11. The method recited in claim 10, wherein said step of writing said parameter measurement data further comprises writing said sets of measurement data for each of said storage medium zones more than once on said selected sector.

12. The method recited in claim 9, wherein said step of writing said parameter measurement data further comprises writing said sets of measurement data for each of said storage medium zones on at least two selected sectors of said calibration track.

13. The method recited in claim 12, wherein said step of writing said parameter measurement data further comprises writing said measurement data for each of said storage medium zones more than once on each of said selected sectors.

14. The method recited in claim 9, wherein said step of correlating said read calibration data comprises correlating each of said sets of read calibration data with a different one of said storage medium zones to form sets of said read channel compensation correction values.

15. The method recited in claim 14, wherein said step of adjusting said selected values comprises adjusting said selected read channel compensation parameter values with each set of said read channel compensation correction values to optimize said read channel compensation parameters values for each of said storage medium zones.

16. A method of adjusting the read channel compensation parameter values of a data storage system having a storage medium to provide the optimum compensation for said storage system, comprising the steps of:

writing test signals on a selected number of tracks having different positions on said storage medium with a first signal transducer to form test tracks with said test signals, each of said test tracks representing a different storage medium zone;

reading said written test signals from said storage medium with said first signal transducer to form read test signals;

analyzing at least one selected parameter of said read test signals from each of said test tracks to form a set of parameter measurement data for each of said storage medium zones;

storing said sets of parameter measurement data;

writing said set of stored parameter measurement data for each of said storage medium zones sequentially on at least one track of said storage medium with said first signal transducer to form at least one calibration track with a set of calibration data for each of said storage medium zones;

setting read channel compensation parameters for said storage system to selected values;

reading said sets of written calibration data from said storage medium with a second signal transducer to form sets of read calibration data;

correlating each of said sets of read calibration data with a different one of said storage medium zones to form sets of read channel correction values; and adjusting said selected read channel compensation parameter values with each set of said read channel compensation correction values to optimize said read channel compensation parameter values for each of said storage medium zones.

17. The method recited in claim 16, wherein said step of writing said parameter measurement data comprises writing sets of parameter measurement data for each of said storage medium zones on a selected sector of said calibration track.

18. The method recited in claim 17, wherein said step of writing said sets of measurement data comprises writing said sets of measurement data for each of said storage medium zones more than once on said selected sector.

19. The method recited in claim 16, wherein said step of writing said parameter measurement data further comprises writing said sets of measurement data for each of said storage medium zones on at least two selected sectors of said calibration track.

20. The method recited in claim 19, wherein said step of writing said sets of measurement data comprises writing said sets of parameter measurement data for each of said storage medium zones more than once on each of said selected sectors.

21. A method of adjusting the read channel compensation values of a data storage system having a magnetic disc to provide the optimum compensation for said storage system, comprising the steps of:

writing test signals on said disc with a first signal transducer to form written test signals;

reading said written test signals from said disc with said first signal transducer to form read test signals;

analyzing at least one selected parameter of said read test signals, wherein said selected parameter comprises write current, pulse width, pulse amplitude and pulse phase shift distortion, to form corresponding parameter measurement data;

storing said parameter measurement data;

writing said stored parameter measurement data on at least one selected track of said disc with said first signal transducer to form at least one calibration track with calibration data;

setting read channel compensation parameters for said storage system to selected values;

reading said written calibration data from said calibration track with a second signal transducer to form read calibration data;

correlating said read calibration data with corresponding read channel compensation parameter values to form selected read channel compensation correction values; and adjusting said selected values of said read channel compensation parameters with said selected read channel compensation correction values to optimize said read channel compensation parameter values.

22. A method of adjusting the read channel compensation parameter values of a data storage system having a magnetic disc to provide the optimum compensation for said storage system, comprising the steps of:

writing test signals on a selected number of different radii test tracks of said disc with a first signal transducer to form test tracks of said different radii with said test signals, each said test track representing a different disc zone;

reading said written test signals from said disc with said first signal transducer to form read test signals;

analyzing at least one selected parameter of said read test signals, wherein said selected parameter comprises write current, pulse width, pulse amplitude and pulse phase shift distortion, from each of said test tracks to form a set of parameter measurement data for each of said disc zones;

storing said sets of parameter measurement data;

writing said set of parameter measurement data for each of said disc zones sequentially on at least one selected calibration track of said disc with said first signal transducer to form a corresponding set of calibration data for each of said disc zones;

setting read channel compensation parameters for said storage system to selected values;

reading said sets of written calibration data from said calibration track with a second signal transducer to form sets of read calibration data;

correlating each of said sets of read calibration data with corresponding read channel compensation parameter values for a different one of said disc zones to form sets of read channel compensation correction values; and adjusting said selected values of said read channel compensation correction values with each set of said read channel compensation correction values for each of said disc zones.

* * * * *